(12) United States Patent
Zhang et al.

(10) Patent No.: US 8,819,531 B2
(45) Date of Patent: Aug. 26, 2014

(54) SYSTEMS AND METHODS FOR INFORMATION DIVERGENCE BASED DATA PROCESSING

(75) Inventors: Fan Zhang, Milpitas, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 85 days.

(21) Appl. No.: 13/558,245

(22) Filed: Jul. 25, 2012

(65) Prior Publication Data

US 2014/0032999 A1    Jan. 30, 2014

(51) Int. Cl.
*G06F 11/00* (2006.01)

(52) U.S. Cl.
USPC ............................ 714/799; 714/796; 714/707

(58) Field of Classification Search
USPC ........... 714/799, 796, 795, 794, 707, 704, 4.3
See application file for complete search history.

(56) References Cited

U.S. PATENT DOCUMENTS

| | | | |
|---|---|---|---|
| 6,496,940 B1 * | 12/2002 | Horst et al. | 714/4.3 |
| 7,113,356 B1 | 9/2006 | Wu | |
| 7,174,501 B2 * | 2/2007 | Fujiwara | 714/795 |
| 2006/0256670 A1 | 11/2006 | Park | |
| 2007/0083648 A1 * | 4/2007 | Addleman et al. | 709/224 |
| 2011/0164669 A1 | 7/2011 | Mathew | |

OTHER PUBLICATIONS

U.S. Appl. No. 13/552,403, filed Jul. 18, 2012, Fan Zhang, Unpublished.
U.S. Appl. No. 13/400,750, filed Feb. 21, 2012, Fan Zhang, Unpublished.
U.S. Appl. No. 13/433,742, filed Mar. 29, 2012, Fan Zhang, Unpublished.
U.S. Appl. No. 13/342,240, filed Jan. 3, 2012, Shaohua Yang, Unpublished.
U.S. Appl. No. 13/316,953, filed Dec. 12, 2011, Haitao Xia, Unpublished.
U.S. Appl. No. 13/340,974, filed Dec. 30, 2011, Dan Liu, Unpublished.
U.S. Appl. No. 13/445,848, filed Apr. 12, 2012, Bruce Wilson, Unpublished.
U.S. Appl. No. 13/251,342, filed Oct. 3, 2011, Haitao Xia, Unpublished.

* cited by examiner

*Primary Examiner* — Fritz Alphonse
(74) *Attorney, Agent, or Firm* — Hamilton DeSanctis & Cha

(57) ABSTRACT

The present inventions are related to systems and methods for information divergence based data processing. As an example, a system is disclosed that includes a scheduling circuit operable to calculate a first quality metric using a first information divergence value calculated based at least in part on the first detected output, and to calculate a second quality metric using a second information divergence value calculated based at least in part on the second detected output. A decoder input is selected based at least in part on the first quality metric and the second quality metric.

20 Claims, 7 Drawing Sheets

SYSTEMS AND METHODS FOR INFORMATION DIVERGENCE BASED DATA PROCESSING

BACKGROUND OF THE INVENTION

The present inventions are related to systems and methods for data processing, and more particularly to systems and methods for information divergence based data processing.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations through a data detector circuit and/or data decoder circuit depending upon the characteristics of the data being processed. Depending upon a number of factors, different data sets require more or fewer iterations through the data detector circuit and/or the data decoder circuit. It is difficult to predict the appropriate number of local and global iterations resulting in some level waste.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for information divergence based data processing.

Various embodiments of the present invention provide data processing systems that include: a data detector circuit, a central memory, a data decoder circuit, and a scheduling circuit. The data detector circuit is operable to apply a data detection algorithm to a first data set to yield a first detected output, and to apply the data detection algorithm to a second data set to yield a second detected output. The central memory is operable to store the first detected output and the second detected output. The data decoder circuit is operable to apply a data decoder algorithm to a selected decoder input to yield a decoded output. The scheduling circuit is operable to calculate a first quality metric using a first information divergence value calculated based at least in part on the first detected output, and to calculate a second quality metric using a second information divergence value calculated based at least in part on the second detected output. The selected decoder input is a derivative of one of the first detected output and the second detected output based at least in part on the first quality metric and the second quality metric.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS OF THE INVENTION

Figure 1:
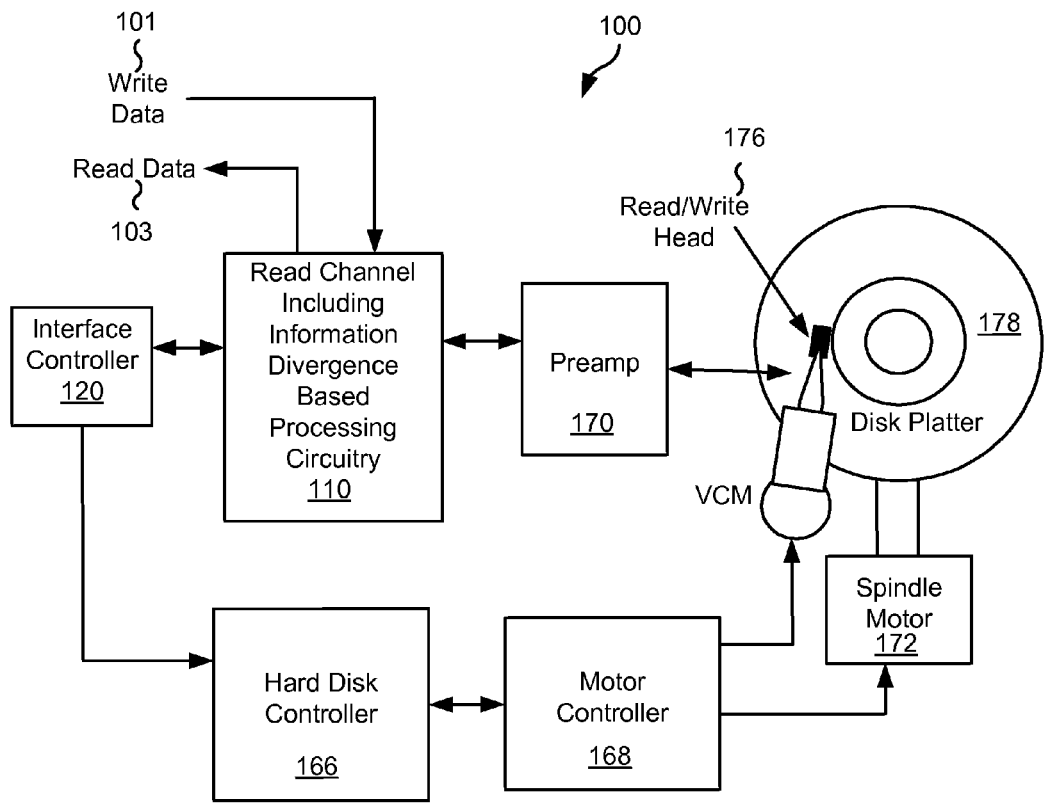
FIG. 1 shows a storage system including information divergence based data processing circuitry in accordance with various embodiments of the present invention.

The present inventions are related to systems and methods for data processing, and more particularly to systems and methods for information divergence based data processing.

It has been discovered that information divergence provides a reasonable indication of data quality. As such, some embodiments of the present invention provide for data processing based at least in part on information divergence. In some cases, the information divergence is used as a proxy for sector quality. The sector quality measurement may be used to define a number local iterations for a particular data set. Alternatively, or in addition, the sector quality information is used to improve scheduling.

Various embodiments of the present invention provide data processing systems that include: a data detector circuit, a central memory, a data decoder circuit, and a scheduling circuit. The data detector circuit is operable to apply a data detection algorithm to a first data set to yield a first detected output, and to apply the data detection algorithm to a second data set to yield a second detected output. The central memory is operable to store the first detected output and the second detected output. The data decoder circuit is operable to apply a data decoder algorithm to a selected decoder input to yield a decoded output. The scheduling circuit is operable to calculate a first quality metric using a first information divergence value calculated based at least in part on the first detected output, and to calculate a second quality metric using a second information divergence value calculated based at least in part on the second detected output. The selected decoder input is a derivative of one of the first detected output and the second detected output based at least in part on the first quality metric and the second quality metric.

In some instances of the aforementioned embodiments, the scheduling circuit includes a quality metric memory operable to store the first quality metric in relation to the first data set and the second quality metric in relation to the second data set. In one or more instances of the aforementioned embodiments, the scheduling circuit is further operable to calculate a first mean squared error sum corresponding to the first data set and a second mean squared error sum corresponding to the second data set. In some such instances, the scheduling circuit is further operable to prioritize application of the data detection algorithm to the first data set and application of the data detection algorithm to the second data set based at least in part on the first mean squared error sum and the second mean squared error sum. In particular cases, prioritizing application of the data detection algorithm to the first data set and application of the data detection algorithm to the second data set based at least in part on the first mean squared error sum and the second mean squared error sum is done on a first global iteration of the first data set and the first global iteration of the second data set.

In various instances of the aforementioned embodiments, the scheduling circuit is further operable prioritize application of the data detection algorithm to the first data set and application of the data detection algorithm to the second data set based at least in part on the first quality metric and the second quality metric. In some such instances, prioritizing application of the data detection algorithm to the first data set and application of the data detection algorithm to the second data set based at least in part on the first quality metric and the second quality metric is done after a first global iteration of the first data set.

Other embodiments of the present invention provide methods for data processing that include: receiving a first data set and a second data set; receiving a first mean squared error value corresponding to the first data set; receiving a second mean squared error value corresponding to the first data set; and prioritizing processing of the first data set and the second data set by a data detector circuit based at least in part on the first mean squared error value and the second mean squared error value. In some instances of the aforementioned embodiments, the methods further include: applying a data detection algorithm by the data detector circuit to the first data set to yield a first detected output; applying the data detection algorithm by the data detector circuit to the second data set to yield a second detected output; calculating a first information divergence value based at least in part on the first detected output; calculating a second information divergence value based at least in part on the second detected output; calculating a first quality metric based at least in part on the first information divergence value; and calculating a second quality metric based at least in part on the second information divergence value. In some such instances, the methods further include: prioritizing processing of the first detected output and the second detected by a data decoder circuit based at least in part on the first quality metric and the second quality metric. In one or more cases, prioritizing processing of the first data set and the second data set by the data detector circuit based at least in part on the first mean squared error value and the second mean squared error value is done on a first global iteration of the first data set and the first global iteration of the second data set. In such cases, the method further includes prioritizing processing of the first data set and the second data set by the data detector circuit based at least in part on the first quality metric and the second quality metric after the first global iteration of the first data set and the first global iteration of the second data set.

Turning to FIG. 1, a storage system 100 including a read channel circuit 110 having information divergence based data processing circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller 190 that includes out of order constraint command circuitry. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 applies a data detection algorithm to the received data set to yield a detected output. Soft information from the detected output is used to calculate a quality metric. The quality metric may be an information divergence. Later applications of the data detection algorithm and a data decode algorithm are prioritized based at least in part on the quality metric. In some cases, the read channel circuit may be implemented similar to that discussed in relation to FIG. 3 or FIG. 5 below; and/or may operate similar to the methods discussed below in relation to FIGS. 4a-4b or FIGS. 6a-6b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
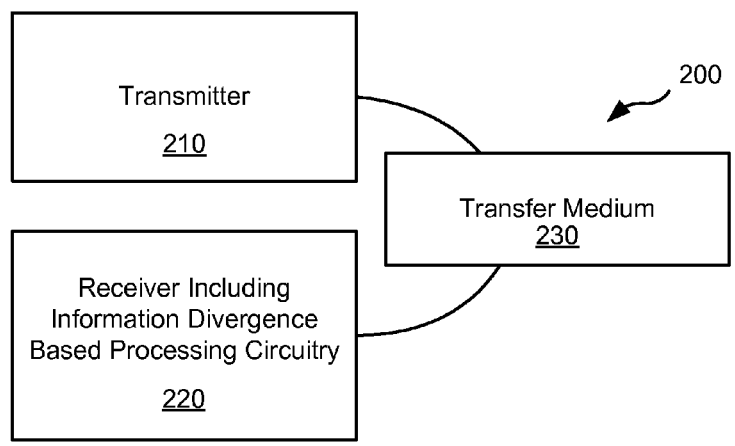
FIG. 2 depicts a data transmission system including information divergence based data processing circuitry in accordance with one or more embodiments of the present invention.

Turning to FIG. 2, a data transmission system 291 including a receiver 295 having information divergence based data processing circuitry is shown in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data.

As part of processing the received information, receiver 295 applies a data detection algorithm to the received data set to yield a detected output. Soft information from the detected output is used to calculate a quality metric. The quality metric may be an information divergence. Later applications of the data detection algorithm and a data decode algorithm are prioritized based at least in part on the quality metric. In some cases, the read channel circuit may be implemented similar to that discussed in relation to FIG. 3 or FIG. 5 below; and/or may operate similar to the methods discussed below in relation to FIGS. 4a-4b or FIGS. 6a-6b.

Figure 3:
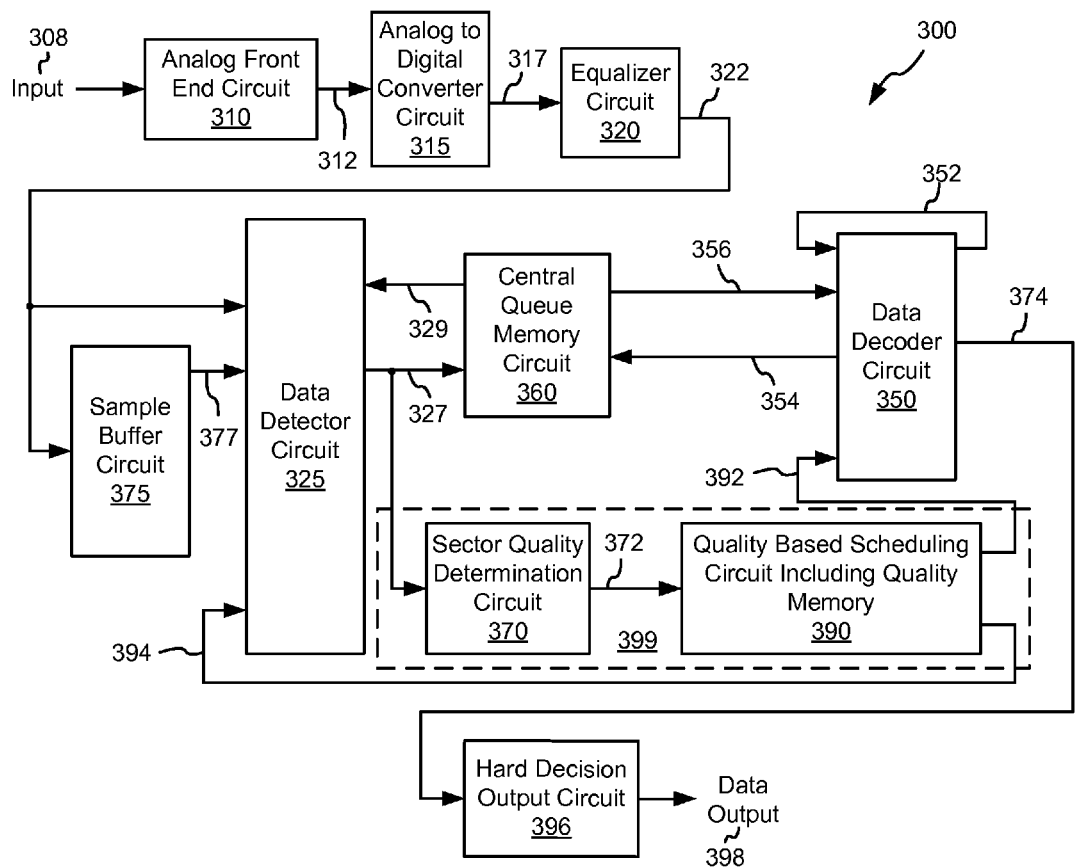
FIG. 3 shows a data processing circuit including divergence based data processing circuitry in accordance with some embodiments of the present invention.

FIG. 3 shows a data processing circuit 300 including shown that includes a based data processing circuit 399 (shown in dashed lines) in accordance with some embodiments of the present invention. Data processing circuit 300 includes an analog front end circuit 310 that receives an analog signal 308. Analog front end circuit 310 processes analog signal 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input signal 308 is derived from a read/write head assembly (not shown) that is disposed in relation to a storage medium (not shown). In other cases, analog input signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art. It may be possible that equalized output 322 may be received directly from a storage device in, for example, a solid state storage system. In such cases, analog front end circuit 310, analog to digital converter circuit 315 and equalizer circuit 320 may be eliminated where the data is received as a digital data input. Equalized output 322 is stored to a sample buffer circuit 375 that includes sufficient memory to maintain one or more codewords until processing of that codeword is completed through a data detector circuit 325 and a data decoder circuit 350 including, where warranted, multiple "global iterations" defined as passes through both data detector circuit 325 and data decoder circuit 350 and/or "local iterations" defined as passes through data decoding circuit 350 during a given global iteration. Sample buffer circuit 375 stores the received data as buffered data 377.

Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Based upon the disclosure provided herein, one of ordinary skill in the art will recognize a variety of data detector circuits that may be used in relation to different embodiments of the present invention. Detected output 325 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

The selection of which buffered data 377 or detector output 329 that will be processed next by data detector circuit 325, and which decoder input 356 will be processed next by data decoder circuit 350 is controlled at least in part by a quality based scheduling circuit 390. Quality based scheduling circuit 390 includes a quality memory operable to hold a quality metric associated with each respective data set awaiting processing. In particular, quality based scheduling circuit 390 provides a decoder selector signal 392 to data decoder circuit 350 that identifies which decoder input 356 in central queue memory circuit 360 that is to be selected next for processing by data decoder circuit 350. In addition, quality based scheduling circuit 390 provides a detector selector signal 394 to data detector circuit 325 that identifies which detector input 329 from central queue memory circuit 360 and/or buffered data 377 that is to be selected next for processing by data detector circuit 325.

The quality memory in quality based scheduling circuit 390 stores a quality metric 372 calculated by a sector quality determination circuit 370 corresponding to each sector of data maintained in central queue memory circuit 360. In particular, sector quality determination circuit 370 receives detected output 327 for a given sector, and calculates a corresponding quality metric based upon detected output 327 and the resulting quality metric is provided as quality metric 372 to the quality memory of quality based scheduling circuit 390.

The quality metric is calculated using an information divergence algorithm as information divergence has been found to be a reasonable proxy for the quality of data included in a sector. The information divergence calculation relies on the soft data (log likelihood ratio (LLR) data) from detected output 327. This soft data acts well as a random variable with a certain probability distribution. Calculating the information divergence relies on a Bregman divergence calculation in accordance with the following equation:

$$B(p \mid q) = \sum_{j=0}^{n-1} \sum_{i=0}^{M} [LLR\_p(i) - LLR\_q(i)],$$

where p and q are two probability mass functions, and M is the number of LLR values for each symbol. For example, in a two bit symbol system, M is equal to three (i.e., LLR[0], LLR[1], LLR[2], LLR[3]). A logarithm taken on the coefficients and normalized to (i.e., subtracted by) the $\log(p(i))(\log(q(j)))$ and $p\_k(j)(q\_k(j))$ is the largest coefficient in $p\_k(q\_k)$. The resulting vectors p' and q' are defined in the equations below:

$$p'=[LLR\_p(0), LLR\_p(1), \ldots LLR\_p(n)]; \text{ and}$$

$$q'=[LLR\_q(0), LLR\_q(1), \ldots LLR\_q(n)],$$

where n is the number of soft data elements in a sector of data received as detected output 327. These two vectors, p and q, are used in the Bregman divergence calculation set forth above. The vector p is the actual soft data received as part of detected output 327, and the vector q is an ideal distribution.

As an example using a GF(4) data processing system (i.e., a two bit non-binary processing system) where an output in detected output 327 may be 0, 1, 2 or 3 with four corresponding soft data values LLR0, LLR1, LLR2, LLR3, respectively. In this case, let the true value (i.e., ideal distribution) be x0 with an LLR value of [0, −30, −30, −30], and let the corresponding hard decision be x1 with an LLR value of [0, −30, −30, −30]. Ideally, one would want to calculate the information divergence between x and x0 to get a perfect measurement of the difference of the probability mass functions between x and x0. More practically, embodiments of the present invention calculate divergence between x and x1. From a practical standpoint, the divergence between x and x1 is almost equal to the divergence between x and x0 where the hard decision error count is low and the hard decision is incorrect. The result of the Bregman divergence calculation is summed over a number of instances and the result is provided as quality metric 372 where it is stored in relation to the sector from which it was calculated.

The following pseudocode shows an example operation of providing quality metric 372 by sector quality determination circuit 370:

```
quality metric 372 = 0 // Initialize the quality metric //
For (i=0 to (n−1)){
    //M is the number of LLR values for each hard decision value,
    e.g., 4 for a 2 bit non-binary //
    LLR_x = Array of detected output 327(i*M to i*(2M−1));
    // identify the hard decision value that corresponds to the highest
    value of LLR_x //
    HD_x = index of LLR_x with the greatest LLR value;
    //Set all LLRs to least likely values //
    LLR_x1=[−31, −31, −31, −31];
```

-continued

```
    //Set LLR value corresponding to the HD_x to a more likely value //
    LLR_x1 (HD_x) = 0;
    //Calculate quality metric 372//
    quality metric 372 = quality metric 372 + Information Divergence
    Value;
}
```

In this case, the information divergence value is calculated in accordance with the Bregman divergence calculation discussed above.

In operation, quality based scheduling circuit 390 schedules the detected output maintained in central queue memory circuit 360 that exhibits the highest value of quality metric 372 as the next sector for processing by data decoder circuit 350. Similarly, quality based scheduling circuit 390 schedules the decoded output maintained in central queue memory circuit 360 that exhibits the highest value of quality metric 372 as the next sector for processing by data detector circuit 325. Based upon the disclosure provided herein, one of ordinary skill in the art may recognize other priority algorithms based upon information divergence that may be used in relation to different embodiments of the present invention. For example, in some cases, the number of unsatisfied checks remaining after the first pass through data decoder circuit 350 may be used for scheduling after completion of the first global iteration for a given sector. For the second and later global iterations, quality metric 372 may be used for scheduling.

Figure 4A:
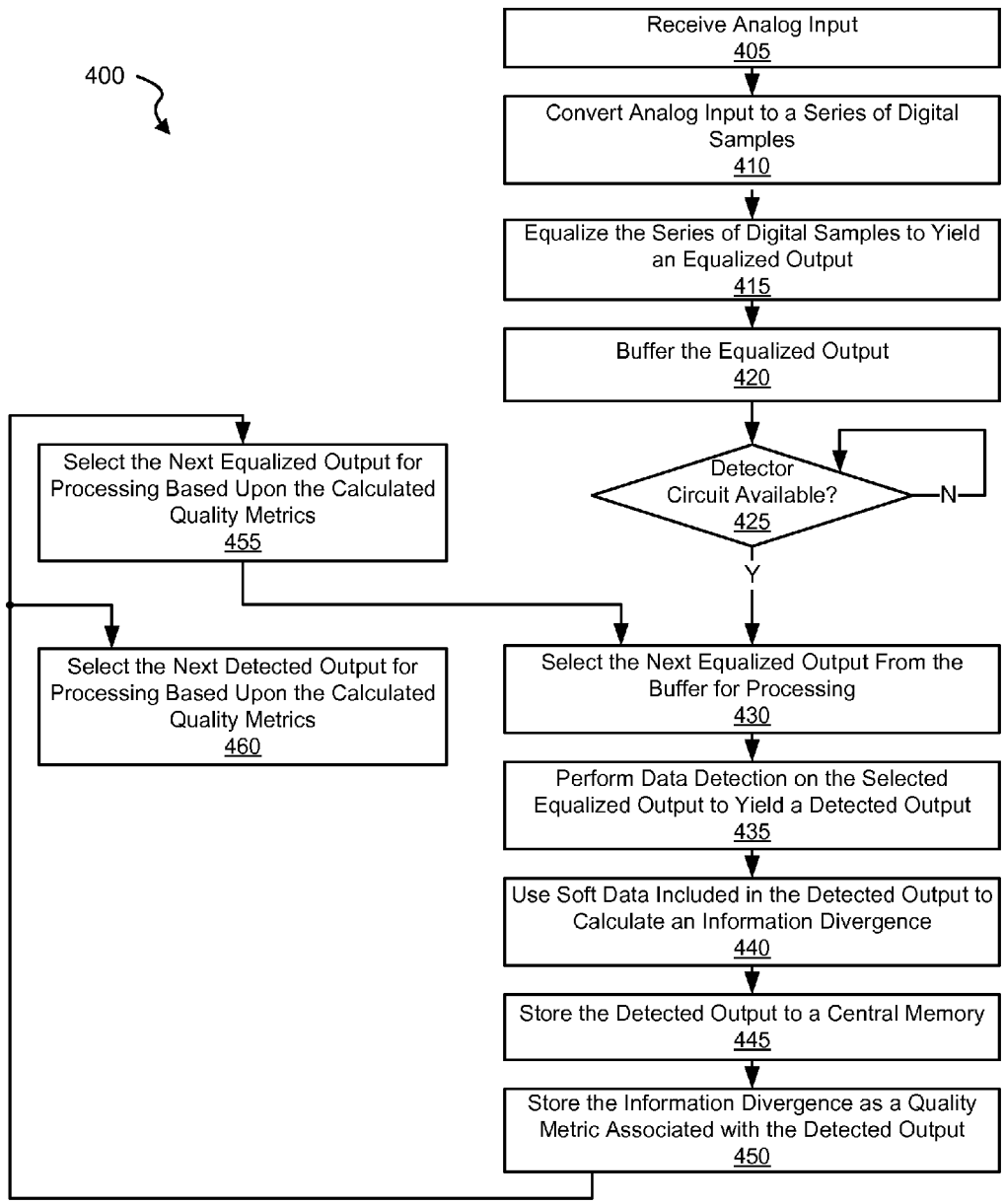
FIGS. 4a-4b are flow diagrams showing a method for divergence based data processing in accordance with some embodiments of the present invention.
Figure 4B:
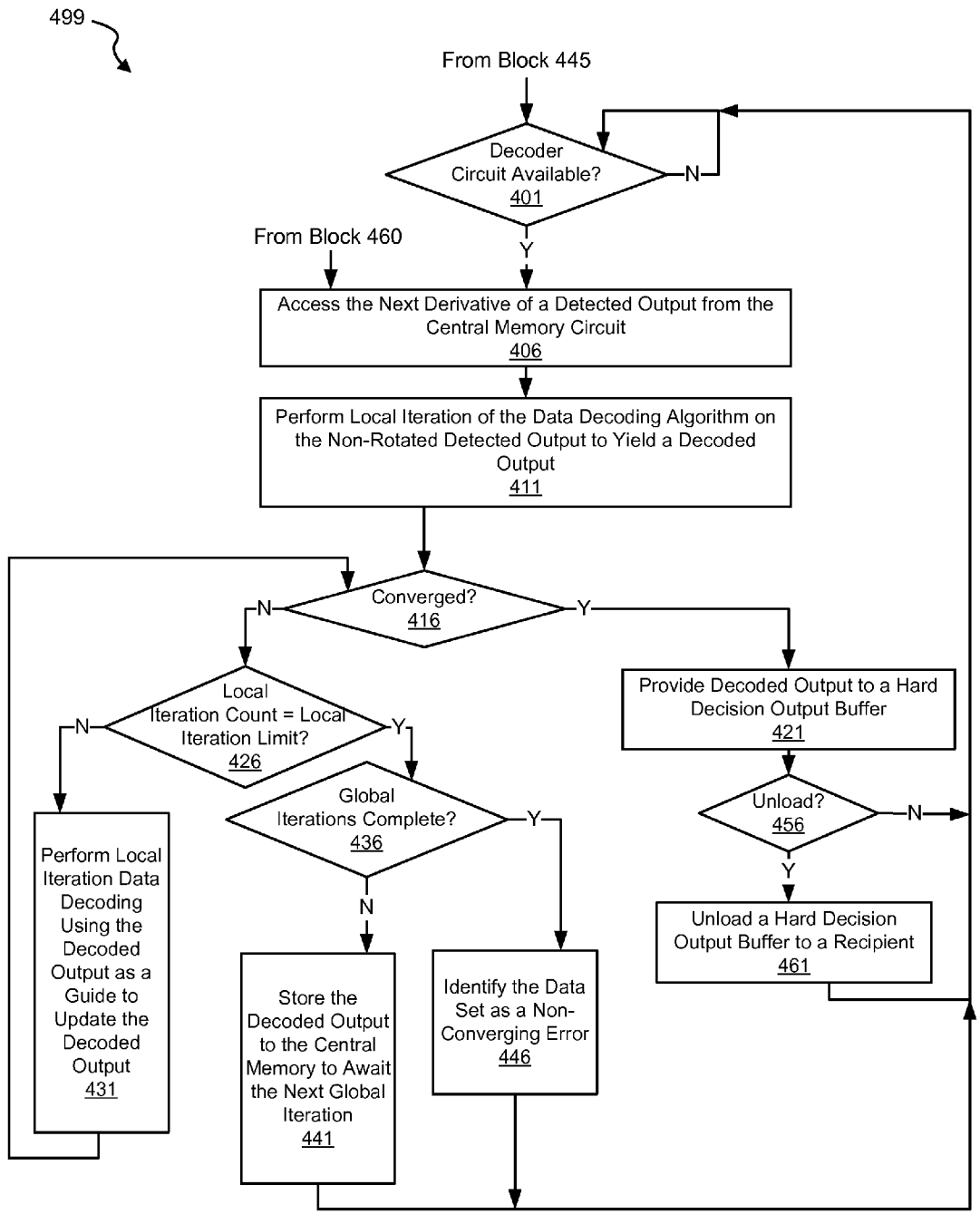

Turning to FIGS. 4a-4b are flow diagrams 400, 499 showing a method for divergence based data processing in accordance with some embodiments of the present invention. Following flow diagram 400 of FIG. 4a, an analog input is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 420).

It is determined whether a data detector circuit is available to process a data set (block 425). Where a data detector circuit is available to process a data set (block 425), the next equalized output from the buffer is accessed for processing (block 430). The data detector circuit may be, for example, a Viterbi algorithm data detector circuit or a maximum a posteriori data detector circuit. The next equalized output selected for processing by the available data detector circuit (block 430), is selected based upon a quality metric that is calculated as more fully discussed below in relation to block 440. A data detection algorithm is applied to the accessed equalized output by the data detector circuit to yield a detected output (block 435).

Soft data included in the detected output is used to calculate an information divergence value (block 440). This information divergence value is calculated in accordance with the following pseudocode:

```
Information Divergence Value = 0 // Initialize the information divergence
value //
For (i=0 to (n-1)){
    //M is the number of LLR values for each hard decision value,
    e.g., 4 for a 2 bit non-binary //
    LLR_x = Array of the detected output(i*M to i*(2M-1));
    // identify the hard decision value that corresponds to the highest
    value of LLR_x //
    HD_x = index of LLR_x with the greatest LLR value;
    //Set all LLRs to least likely values //
    LLR_x1=[-31, -31, -31, -31];
    //Set LLR value corresponding to the HD_x to a more likely value //
    LLR_x1 (HD_x) = 0;
    //Calculate Information Divergence Value //
    Information Divergence Value = Information Divergence Value +
    Update Value;
}
```

In this case, the update value is calculated in accordance with the Bregman divergence calculation discussed above in relation to FIG. 3.

The detected output is stored to a central queue memory circuit where it awaits processing by a data decoder circuit (block 445). In addition, the information divergence value calculated in block 440 is stored as a quality metric for the equalized output recently processed through the data detected output (block 450). This quality metric is used to select which equalized output will be processed next by the data detector circuit (block 455). In one particular embodiment of the present invention, the equalized output having the quality metric with the highest value is selected to be accessed from the buffer and processed by the data detector circuit. Where the only equalized outputs available in the sample buffer circuit have not passed through a first global iterations and therefore do not include a quality metric, one of the available equalized outputs is selected based upon the time that the equalized output has been maintained in the sample buffer. Based upon the disclosure provided herein, one of ordinary skill in the art may recognize other priority algorithms based upon information divergence that may be used in relation to different embodiments of the present invention. For example, in some cases, the number of unsatisfied checks remaining after the first pass through data decoder circuit 350 may be used for scheduling after completion of the first global iteration for a given sector. For the second and later global iterations, the quality metric of block 450 may be used for scheduling.

In addition, the next detected output maintained in the central queue memory circuit is selected based upon the quality metric of block 450 (block 460). In one particular embodiment of the present invention, the detected output maintained in the central queue memory circuit having the quality metric with the highest value is selected to be accessed from the central queue memory circuit for processing by a data decoder circuit. Based upon the disclosure provided herein, one of ordinary skill in the art may recognize other priority algorithms based upon information divergence that may be used in relation to different embodiments of the present invention.

Turning to FIG. 4b and following flow diagram 499, it is determined whether a data decoder circuit is available (block 401) in parallel to the previously described data detection process of FIG. 4a. The data decoder circuit may be, for example, a low density parity check data decoder circuit as are known in the art. Where the data decoder circuit is available (block 401) the next derivative of a detected output is selected from the central queue memory circuit (block 406). The derivative of the detected output may be, for example, an interleaved (shuffled) version of a detected output from the data detector circuit. The selected derivative of the detected output is done based upon a selection indicator derived from quality metric information as discussed above in relation to block 460. A first local iteration of a data decoding algorithm is applied by the data decoder circuit to the selected detected output to yield a decoded output (block 411). It is then determined whether the decoded output converged (e.g., resulted in the originally written data as indicated by the lack of remaining unsatisfied checks) (block 416).

Where the decoded output converged (block 416), it is provided as a decoded output codeword to a hard decision output buffer (e.g., a re-ordering buffer) (block 421). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 456). Where the currently received output codeword is either sequential to a previously reported codeword or completes an ordered set of codewords (block 456), the currently received output codeword and, where applicable, other codewords forming an in order sequence of codewords are provided to a recipient as an output (block 461).

Alternatively, where the decoded output failed to converge (e.g., errors remain) (block 416), it is determined whether the number of local iterations already applied equals the maximum number of local iterations (block 426). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 426), the data decoding algorithm is applied to the selected data set using the decoded output as a guide to update the decoded output (block 431). The processes of blocks starting at block 416 are repeated for the next local iteration.

Alternatively, where all of the local iterations have occurred (block 426), it is determined whether all of the global iterations have been applied to the currently processing data set (block 436). Where the number of global iterations has not completed (block 436), the decoded output is stored to the central queue memory circuit to await the next global iteration (block 441). Alternatively, where the number of global iterations has completed (block 436), an error is indicated and the data set is identified as non-converging (block 446).

Figure 5:
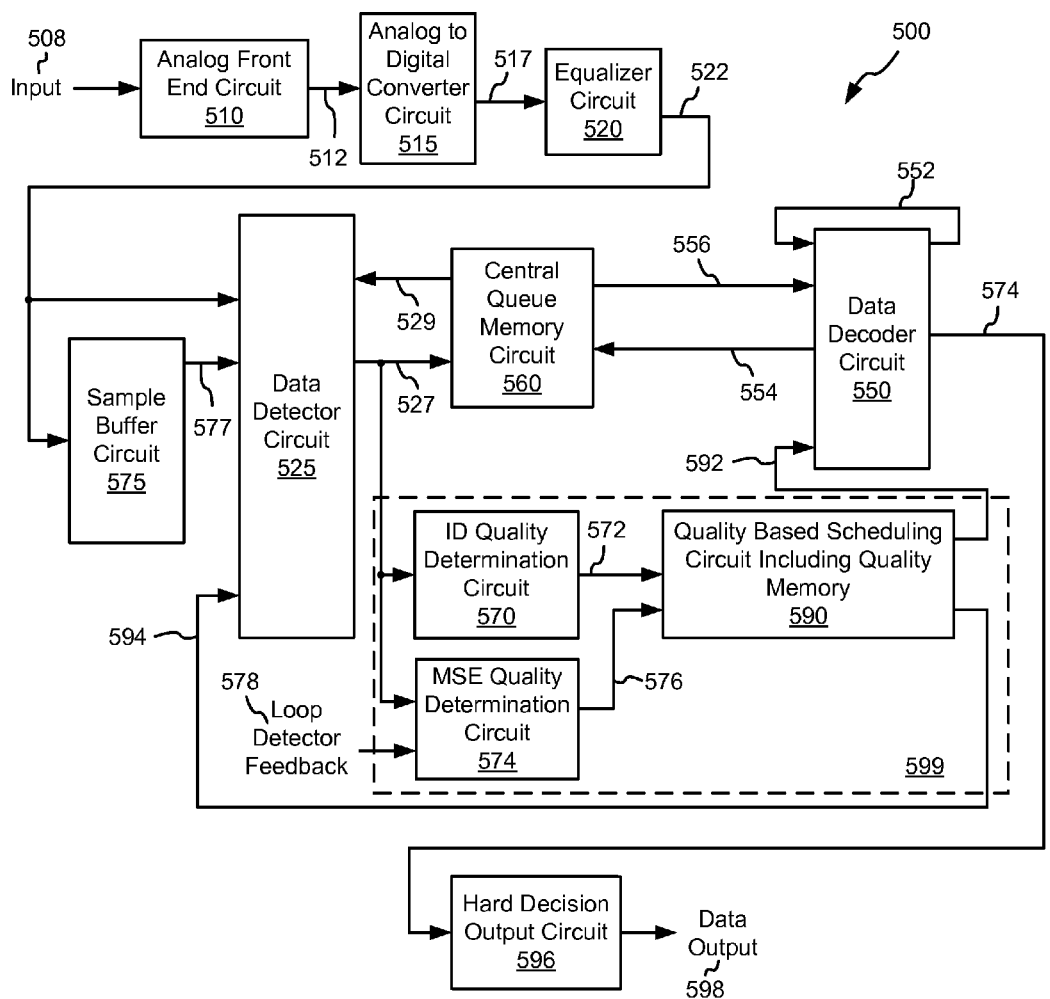
FIG. 5 shows a data processing circuit including combination quality metric based data processing circuitry in accordance with some embodiments of the present invention.

Turning to FIG. 5, a data processing circuit 500 is shown that includes combination quality metric based data processing circuit 599 (shown in dashed lines) in accordance with some embodiments of the present invention. Data processing circuit 500 includes an analog front end circuit 510 that receives an analog signal 508. Analog front end circuit 510 processes analog signal 508 and provides a processed analog signal 512 to an analog to digital converter circuit 515. Analog front end circuit 510 may include, but is not limited to, an analog filter and an amplifier circuit as are known in the art. Based upon the disclosure provided herein, one of ordinary skill in the art will recognize a variety of circuitry that may be included as part of analog front end circuit 510. In some cases, analog input signal 508 is derived from a read/write head assembly (not shown) that is disposed in relation to a storage medium (not shown). In other cases, analog input signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 508 may be derived.

Analog to digital converter circuit 515 converts processed analog signal 512 into a corresponding series of digital samples 517. Analog to digital converter circuit 515 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 517 are provided to an equalizer circuit 520. Equalizer circuit 520 applies an equalization algorithm to digital samples 517 to yield an equalized output 522. In some embodiments of the present invention, equalizer circuit 520 is a digital finite impulse response filter circuit as are known in the art. It may be possible that equalized output 522 may be received directly from a storage device in, for example, a solid state storage system. In such cases, analog front end circuit 510, analog to digital converter circuit 515 and equalizer circuit 520 may be eliminated where the data is received as a digital data input. Equalized output 522 is stored to a sample buffer circuit 575 that includes sufficient memory to maintain one or more codewords until processing of that codeword is completed through a data detector circuit 525 and a data decoder circuit 550 including, where warranted, multiple "global iterations" defined as passes through both data detector circuit 525 and data decoder circuit 550 and/or "local iterations" defined as passes through data decoding circuit 550 during a given global iteration. Sample buffer circuit 575 stores the received data as buffered data 577.

Data detector circuit 525 may be any data detector circuit known in the art that is capable of producing a detected output 527. As some examples, data detector circuit 525 may be, but is not limited to, a Viterbi algorithm detector circuit or a maximum a posteriori detector circuit as are known in the art. Based upon the disclosure provided herein, one of ordinary skill in the art will recognize a variety of data detector circuits that may be used in relation to different embodiments of the present invention. Detected output 525 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 527 is provided to a central queue memory circuit 560 that operates to buffer data passed between data detector circuit 525 and data decoder circuit 550. When data decoder circuit 550 is available, data decoder circuit 550 receives detected output 527 from central queue memory 560 as a decoder input 556. Data decoder circuit 550 applies a data decoding algorithm to decoder input 556 in an attempt to recover originally written data. The result of the data decoding algorithm is provided as a decoded output 554. Similar to detected output 527, decoded output 554 may include both hard decisions and soft decisions. For example, data decoder circuit 550 may be any data decoder circuit known in the art that is capable of applying a decoding algorithm to a received input. Data decoder circuit 550 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 550 provides the result of the data decoding algorithm as a data output 574. Data output 574 is provided to a hard decision output circuit 596 where the data is reordered before providing a series of ordered data sets as a data output 598.

One or more iterations through the combination of data detector circuit 525 and data decoder circuit 550 may be made in an effort to converge on the originally written data set. As mentioned above, processing through both the data detector circuit and the data decoder circuit is referred to as a "global iteration". For the first global iteration, data detector circuit 525 applies the data detection algorithm without guidance from a decoded output. For subsequent global iterations, data detector circuit 525 applies the data detection algorithm to buffered data 577 as guided by decoded output 554. Decoded output 554 is received from central queue memory 560 as a detector input 529.

During each global iteration it is possible for data decoder circuit 550 to make one or more local iterations including application of the data decoding algorithm to decoder input 556. For the first local iteration, data decoder circuit 550 applies the data decoder algorithm without guidance from a decoded output 552. For subsequent local iterations, data decoder circuit 550 applies the data decoding algorithm to decoder input 556 as guided by a previous decoded output 552. In some embodiments of the present invention, a default of ten local iterations is allowed for each global iteration.

The selection of which buffered data 577 and/or detector output 529 that will be processed next by data detector circuit 525, and which decoder input 556 will be processed next by data decoder circuit 550 is controlled at least in part by a quality based scheduling circuit 590. Quality based scheduling circuit 590 includes a quality memory operable to hold a quality metric associated with each respective data set awaiting processing. In particular, quality based scheduling circuit 590 provides a decoder selector signal 592 to data decoder circuit 550 that identifies which decoder input 556 in central queue memory circuit 560 that is to be selected next for processing by data decoder circuit 550. In addition, quality based scheduling circuit 590 provides a detector selector signal 594 to data detector circuit 525 that identifies which detector input 529 from central queue memory circuit 560 and/or buffered data 577 that is to be selected next for processing by data detector circuit 525.

The quality memory in quality based scheduling circuit 590 stores one of a quality metric 572 calculated by a sector quality determination circuit 570 corresponding to each sector of data maintained in central queue memory circuit 560, or a quality metric 576 calculated by a mean square error quality determination circuit 574. In particular, sector quality determination circuit 570 receives detected output 527 for a given sector, and calculates a corresponding quality metric based upon detected output 527 and the resulting quality metric is provided as quality metric 572 to the quality memory of quality based scheduling circuit 590. Mean square error quality determination circuit 574 calculates a mean squared error based upon a combination of a loop detector feedback 578 and detected output 527. Mean square error quality determination circuit 574 may be any circuit known in the art that is capable of calculating a mean squared error for a series of data inputs. A sum of the mean squared errors across a sector is created by mean square error quality determination circuit 574, and the result is provided as quality metric 576. In some cases, loop detector feedback 578 is the mean squared error, and mean square error quality determination circuit 574 operates to sum the mean squared error values across the sector to yield quality metric 576.

Quality metric 572 is calculated using an information divergence algorithm as information divergence has been found to be a reasonable proxy for the quality of data included in a sector. The information divergence calculation relies on the soft data (log likelihood ratio (LLR) data) from detected output 527. This soft data acts well as a random variable with a certain probability distribution. Calculating the information divergence relies on a Bregman divergence calculation in accordance with the following equation:

$$B(p \mid q) = \sum_{j=0}^{n-1} \sum_{i=0}^{M} [\text{LLR}\_p(i) - \text{LLR}\_q(i)],$$

where p and q are two probability mass functions, n is the number of elements, and M is the number of LLR values for each symbol. For example, in a two bit symbol system, M is equal to three (i.e., LLR[0], LLR[1], LLR[2], LLR[3]). A logarithm taken on the coefficients and normalized to (i.e., subtracted by) the $\log(p(i))(\log(q(j)))$ and $p\_k(j)(q\_k(j))$ is the largest coefficient in $p\_k(q\_k)$. The resulting vectors p' and q' are defined in the equations below:

$$p'=[\text{LLR}\_p(0),\text{LLR}\_p(1),\ldots\text{LLR}\_p(n)]; \text{and}$$

$$q'=[\text{LLR}\_q(0),\text{LLR}\_q(1),\ldots\text{LLR}\_q(n)],$$

where n is the number of soft data elements in a sector of data received as detected output 527. These two vectors, p and q, are used in the Bregman divergence calculation set forth above. The vector p is the actual soft data received as part of detected output 527, and the vector q is an ideal distribution.

As an example using a GF(4) data processing system (i.e., a two bit non-binary processing system) where an output in detected output 527 may be 0, 1, 2 or 3 with four corresponding soft data values LLR0, LLR1, LLR2, LLR3, respectively. In this case, let the true value (i.e., ideal distribution) be x0 with an LLR value of [0, −30, −30, −30], and let the corresponding hard decision be x1 with an LLR value of [0, −30, −30, −30]. In this case, −30 indicates less likely than 0. Ideally, one would want to calculate the information divergence between x and x0 to get a perfect measurement of the difference of the probability mass functions between x and x0. More practically, embodiments of the present invention calculate divergence between x and x1. From a practical standpoint, the divergence between x and x1 is almost equal to the divergence between x and x0 where the hard decision error count is low and the hard decision is incorrect. The result of the Bregman divergence calculation is summed over a number of instances and the result is provided as quality metric 572 where it is stored in relation to the sector from which it was calculated.

The following pseudocode shows an example operation of providing quality metric 572 by sector quality determination circuit 570:

```
quality metric 572 = 0 // Initialize the quality metric //
For (i=0 to (n-1)){
    //M is the number of LLR values for each hard decision value, e.g.,
    4 for a 2 bit non-binary //
    LLR_x = Array of detected output 327(i*M to i*(2M−1));
    // identify the hard decision value that corresponds to the highest
    value of LLR_x //
    HD_x = index of LLR_x with the greatest LLR value;
    //Set all LLRs to least likely values //
    LLR_x1=[−31, −31, −31, −31];
    //Set LLR value corresponding to the HD_x to a more likely value //
    LLR_x1 (HD_x) = 0;
    //Calculate quality metric 572//
    quality metric 572 = quality metric 572 + Information Divergence
    Value;
}
```

In this case, the information divergence value is calculated in accordance with the Bregman divergence calculation discussed above.

In operation, quality based scheduling circuit 590 schedules the detected output maintained in central queue memory circuit 560 for processing by data decoder circuit 550, and schedules the decoded output maintained in central queue memory circuit 560 based upon a combination of both quality metric 572 and quality metric 576. In particular, for sectors being processed for their first global iteration, quality metric 576 generated from a loop detector circuit (not shown) is used for scheduling. For the second and later global iterations, quality metric 572 is used.

Quality based scheduling circuit 590 uses the following rules to schedule the next buffered data 577 and where available decoded output available from central queue memory circuit 560 for processing by data detector circuit 525:

- If no sector (i.e., data set) is ready for data detector circuit 525 in central memory queue circuit 560 and central queue memory circuit 560 has an empty slot, then quality based scheduling circuit 590 selects a data set from sample buffer 575 that exhibits the lowest value of quality metric 576 for processing by data detector circuit 525;
- If there is/are at least one sector ready for data detector circuit 525 in central memory queue circuit 560, then quality based scheduling circuit 590 selects a data set from sample buffer 575 that exhibits the lowest value of quality metric 576 for processing by data detector circuit 525; or
- If there are not any free slots in central memory queue circuit 560, and there are not any sectors ready for processing, data detector circuit 525 will be idle.

Quality based scheduling circuit 590 uses the following rules to schedule the next detected output from central memory queue circuit 560 for processing by data decoder circuit 550:

- If there is/are at least one sector ready for data decoder circuit 550 in central memory queue circuit 560, then quality based scheduling circuit 590 selects the data set from central queue memory circuit 560 that exhibits the lowest value of quality metric 572 for processing by data decoder circuit 550; or
- If there are not any free slots in central memory queue circuit 560, and there are not any sectors ready for processing, data decoder circuit 550 will be idle.

Figure 6A:
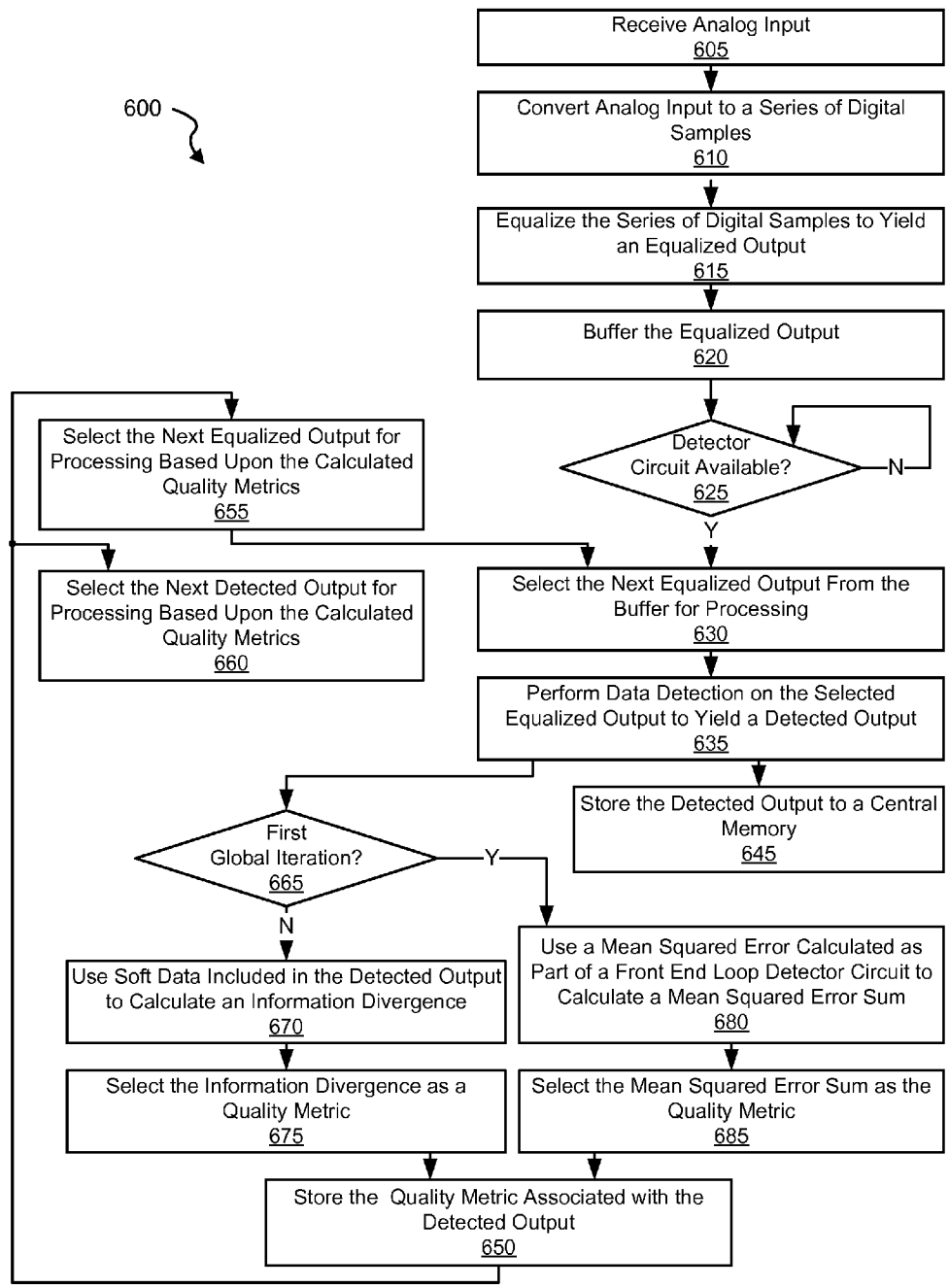
FIGS. 6a-6b are flow diagrams showing a method for combination quality metric based data processing in accordance with some embodiments of the present invention.
Figure 6B:
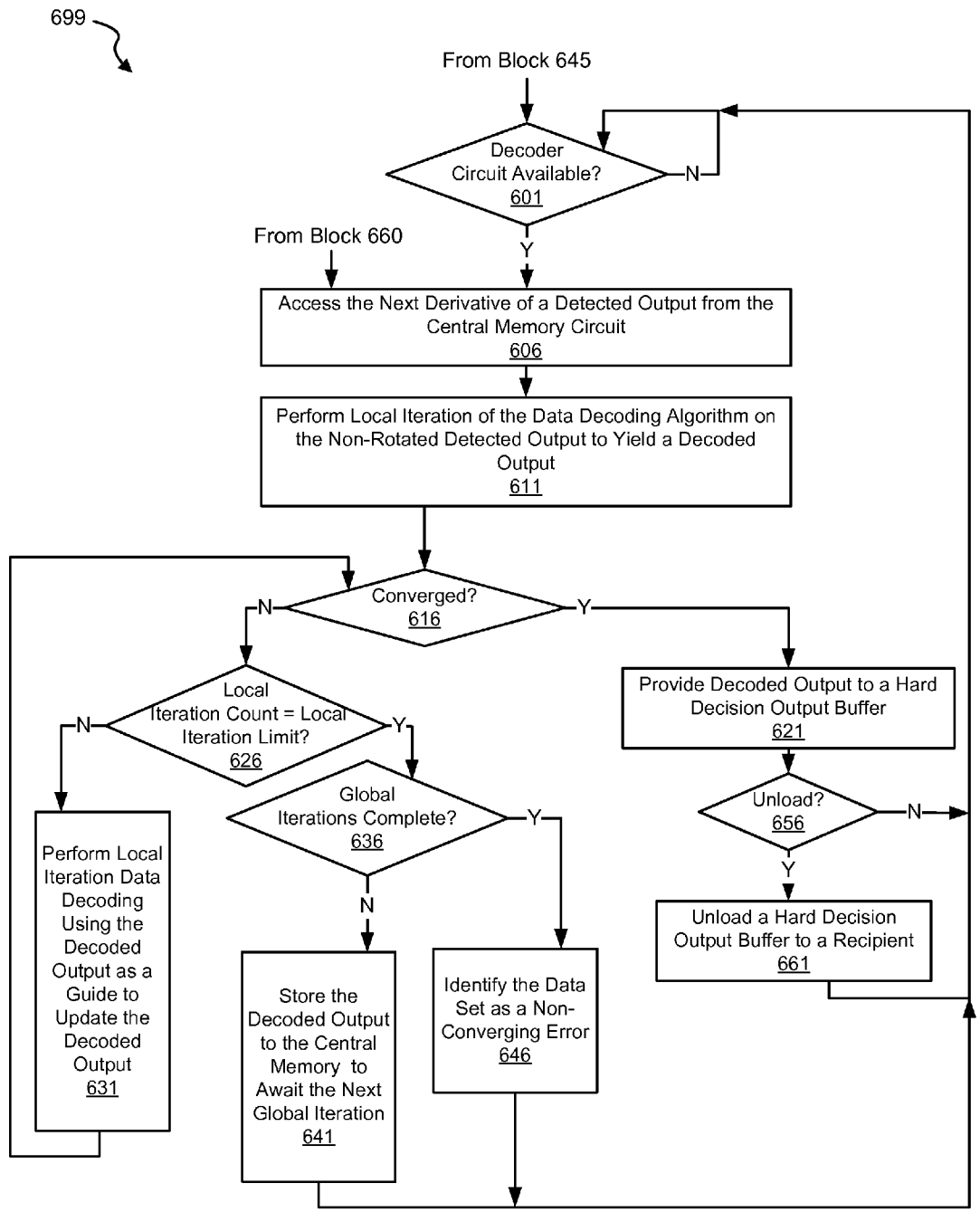

Turning to FIGS. 6a-6b are flow diagrams 600, 699 showing a method for for combination quality metric based data processing in accordance with some embodiments of the present invention. Following flow diagram 600 of FIG. 6a, an analog input is received (block 605). The analog input may be derived from, for example, a storage medium or a data transmission channel. Based upon the disclosure provided herein, one of ordinary skill in the art will recognize a variety of sources of the analog input. The analog input is converted to a series of digital samples (block 610). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 615). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 620).

It is determined whether a data detector circuit is available to process a data set (block 625). Where a data detector circuit is available to process a data set (block 625), the next equalized output from the buffer is accessed for processing (block 630). The data detector circuit may be, for example, a Viterbi algorithm data detector circuit or a maximum a posteriori data detector circuit. The next equalized output selected for processing by the available data detector circuit (block 630), is selected based upon a quality metric that is calculated as more fully discussed below in relation to block 640 and block 680. A data detection algorithm is applied to the accessed equalized output by the data detector circuit to yield a detected output (block 635). The detected output is stored to a central queue memory circuit where it awaits processing by a data decoder circuit (block 645).

It is determined whether the currently processing data set is being processed in a first global iteration or a second or later global iteration (block 665). Where it is the first global iteration (block 665), a mean squared error value received from a front end loop detector circuit is used to calculate a mean squared error sum (block 680). The sum of the mean squared error values for each element of the detected output are summed, and the sum is selected as a quality metric (block 685). Of note, this quality metric is available for selection of an equalized data set for processing by the data detector circuit prior to the start of the first global iteration.

Alternatively, where it is a second or later global iteration (block 665), soft data included in the detected output is used to calculate an information divergence value (block 670). This information divergence value is calculated in accordance with the following pseudocode:

```
Information Divergence Value = 0 // Initialize the information divergence
value //
For (i=0 to (n-1)){
    //M is the number of LLR values for each hard decision value, e.g.,
    4 for a 2 bit non-binary //
    LLR_x = Array of the detected output (i*M to i*(2M−1));
    // identify the hard decision value that corresponds to the
    highest value of LLR_x //
    HD_x = index of LLR_x with the greatest LLR value;
    //Set all LLRs to least likely values //
    LLR_x1=[−31, −31, −31, −31];
    //Set LLR value corresponding to the HD_x to a more likely value //
    LLR_x1 (HD_x) = 0;
    //Calculate Information Divergence Value //
    Information Divergence Value = Information Divergence Value +
    Update Value;
}
```

In this case, the update value is calculated in accordance with the Bregman divergence calculation discussed above in relation to FIG. 5. The information divergence value is selected as a quality metric for the currently processing data set (block 675). The quality metric (either the quality metric from block 675 or the quality metric from block 685) is stored in relation to the detected output (block 650).

The quality metrics for various data sets are used to select the next data set for processing by the data detector circuit and a data decoder circuit. In particular, the next equalized output for processing by the data detector circuit is selected based on the calculated quality metrics (block 655). In one particular embodiment of the present invention, the following rules are used to schedule the next equalized output for processing by the data detector circuit:

If no sector (i.e., data set) is ready for the data detector circuit in the central memory queue circuit and the central queue memory circuit has an empty slot, then a data set from the sample buffer is selected that exhibits the lowest value of the quality metric for processing by the data detector circuit;

If there is/are at least one sector ready for the data detector circuit in the central memory queue circuit, then a data set from the sample buffer that exhibits the lowest value of the quality metric by the data detector circuit; or If there are not any free slots in the central memory queue circuit, and there are not any sectors ready for processing, the data detector circuit will be idle.

In addition, the next equalized output for processing by the data decoder circuit is selected based on the calculated quality metrics (block 660). In one particular embodiment of the present invention, the following rules are used to schedule the next detected output from the central memory queue circuit for processing by the data decoder circuit:

If there is/are at least one sector ready for the data decoder circuit in the central memory queue circuit, then the data set from the central queue memory circuit that exhibits the lowest value of the quality metric is selected for processing by data decoder circuit; or If there are not any free slots in the central memory queue circuit, and there are not any sectors ready for processing, the data decoder circuit will be idle.

Turning to FIG. 6b and following flow diagram 699, it is determined whether a data decoder circuit is available (block 601) in parallel to the previously described data detection process of FIG. 6a. The data decoder circuit may be, for example, a low density parity check data decoder circuit as are known in the art. Where the data decoder circuit is available (block 601) the next derivative of a detected output is selected from the central queue memory circuit (block 606). The derivative of the detected output may be, for example, an interleaved (shuffled) version of a detected output from the data detector circuit. The selected derivative of the detected output is done based upon a selection indicator derived from quality metric information as discussed above in relation to block 660. A first local iteration of a data decoding algorithm is applied by the data decoder circuit to the selected detected output to yield a decoded output (block 611). It is then determined whether the decoded output converged (e.g., resulted in the originally written data as indicated by the lack of remaining unsatisfied checks) (block 416).

Where the decoded output converged (block 416), it is provided as a decoded output codeword to a hard decision output buffer (e.g., a re-ordering buffer) (block 621). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 656). Where the currently received output codeword is either sequential to a previously reported codeword or completes an ordered set of codewords (block 656), the currently received output codeword and, where applicable, other codewords forming an in order sequence of codewords are provided to a recipient as an output (block 661).

Alternatively, where the decoded output failed to converge (e.g., errors remain) (block 616), it is determined whether the number of local iterations already applied equals the maximum number of local iterations (block 626). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 626), the data decoding algorithm is applied to the selected data set using the decoded output as a guide to update the decoded output (block 631). The processes of blocks starting at block 416 are repeated for the next local iteration.

Alternatively, where all of the local iterations have occurred (block 626), it is determined whether all of the global iterations have been applied to the currently processing data set (block 636). Where the number of global iterations has not completed (block 636), the decoded output is stored to the central queue memory circuit to await the next global iteration (block 641). Alternatively, where the number of global iterations has completed (block 636), an error is indicated and the data set is identified as non-converging (block 646).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
a data detector circuit operable to apply a data detection algorithm to a first data set to yield a first detected output, and to apply the data detection algorithm to a second data set to yield a second detected output;

a central memory operable to store the first detected output and the second detected output;

a data decoder circuit operable to apply a data decoder algorithm to a selected decoder input to yield a decoded output; and a scheduling circuit operable to calculate a first quality metric using a first information divergence value calculated based at least in part on the first detected output, and to calculate a second quality metric using a second information divergence value calculated based at least in part on the second detected output; wherein the selected decoder input is a derivative of one of the first detected output and the second detected output based at least in part on the first quality metric and the second quality metric.

2. The data processing system of claim 1, wherein the scheduling circuit includes a quality metric memory operable to store the first quality metric in relation to the first data set and the second quality metric in relation to the second data set.

3. The data processing system of claim 1, wherein the scheduling circuit is further operable to calculate a first mean squared error sum corresponding to the first data set and a second mean squared error sum corresponding to the second data set.

4. The data processing system of claim 3, wherein the scheduling circuit is further operable to prioritize application of the data detection algorithm to the first data set and application of the data detection algorithm to the second data set based at least in part on the first mean squared error sum and the second mean squared error sum.

5. The data processing system of claim 4, wherein prioritizing application of the data detection algorithm to the first data set and application of the data detection algorithm to the second data set based at least in part on the first mean squared error sum and the second mean squared error sum is done on a first global iteration of the first data set and the first global iteration of the second data set.

6. The data processing system of claim 1, wherein the scheduling circuit is further operable prioritize application of the data detection algorithm to the first data set and application of the data detection algorithm to the second data set based at least in part on the first quality metric and the second quality metric.

7. The data processing system of claim 6, wherein prioritizing application of the data detection algorithm to the first data set and application of the data detection algorithm to the second data set based at least in part on the first quality metric and the second quality metric is done after a first global iteration of the first data set.

8. The data processing system of claim 1, wherein the system is implemented as an integrated circuit.

9. The data processing system of claim 1, wherein the system is implemented as part of device selected from a group consisting of: a storage device, and a communication device.

10. The data processing system of claim 1, wherein the data detector circuit is selected from a group consisting of: a maximum a posteriori data detector circuit, and a Viterbi algorithm data detector circuit.

11. The data processing system of claim 1, wherein the data decoder circuit is a low density parity check decoder circuit.

12. A method for data processing, the method comprising:
receiving a first data set and a second data set;
receiving a first mean squared error value corresponding to the first data set;
receiving a second mean squared error value corresponding to the first data set; and
using a scheduling circuit to prioritize an order of processing of the first data set and the second data set by a data detector circuit based at least in part on the first mean squared error value and the second mean squared error value.

13. The method of claim 12, the method further comprising:
applying a data detection algorithm by the data detector circuit to the first data set to yield a first detected output;
applying the data detection algorithm by the data detector circuit to the second data set to yield a second detected output;
calculating a first information divergence value based at least in part on the first detected output;
calculating a second information divergence value based at least in part on the second detected output;
calculating a first quality metric based at least in part on the first information divergence value; and
calculating a second quality metric based at least in part on the second information divergence value.

14. The method of claim 13, wherein the method further comprises:
prioritizing processing of the first detected output and the second detected by a data decoder circuit based at least in part on the first quality metric and the second quality metric.

15. The method of claim 14, wherein the data decoder circuit is a low density parity check decoder circuit.

16. The method of claim 14, wherein prioritizing processing of the first data set and the second data set by the data detector circuit based at least in part on the first mean squared error value and the second mean squared error value is done on a first global iteration of the first data set and the first global iteration of the second data set; and wherein the method further comprises:
prioritizing processing of the first data set and the second data set by the data detector circuit based at least in part on the first quality metric and the second quality metric after the first global iteration of the first data set and the first global iteration of the second data set.

17. The method of claim 12, wherein the data detector circuit is selected from a group consisting of: a maximum a posteriori data detector circuit, and a Viterbi algorithm data detector circuit.

18. A storage device, the storage device comprising:
a storage medium;
a head assembly disposed in relation to the storage medium and operable to provide a sensed signal corresponding to a first data set on the storage medium and a second data set on the storage medium
a read channel circuit including:
an analog front end circuit operable to provide an analog signal corresponding to the sensed signal;
an analog to digital converter circuit operable to sample the analog signal to yield a series of digital samples;
an equalizer circuit operable to equalize the digital samples corresponding to the first data set to yield a first sample set, and to equalize the digital samples corresponding to the second data set to yield a second sample set;
a data detector circuit operable to apply a data detection algorithm to a the first sample set to yield a first detected output, and to apply the data detection algorithm to a second sample set to yield a second detected output;
a central memory operable to store the first detected output and the second detected output;

a data decoder circuit operable to apply a data decoder algorithm to a selected decoder input to yield a decoded output; and a scheduling circuit operable to calculate a first quality metric using a first information divergence value calculated based at least in part on the first detected output, and to calculate a second quality metric using a second information divergence value calculated based at least in part on the second detected output; wherein the selected decoder input is a derivative of one of the first detected output and the second detected output based at least in part on the first quality metric and the second quality metric.

19. The storage device of claim 18, wherein the storage device further comprises:

a solid state memory device.

20. The storage device of claim 18, wherein the scheduling circuit is further operable to calculate a first mean squared error sum corresponding to the first data set and a second mean squared error sum corresponding to the second data set; wherein the scheduling circuit is further operable prioritize application of the data detection algorithm to the first data set and application of the data detection algorithm to the second data set based at least in part on the first mean squared error sum and the second mean squared error sum; and wherein prioritizing application of the data detection algorithm to the first data set and application of the data detection algorithm to the second data set based at least in part on the first mean squared error sum and the second mean squared error sum is done on a first global iteration of the first data set and the first global iteration of the second data set.

* * * * *